United States Patent
Bennett

[15] 3,654,760
[45] Apr. 11, 1972

[54] CONTROL DEVICE FOR A HYDROSTATIC TRANSMISSION AND A HYDROSTATIC TRANSMISSION EMBODYING SUCH A DEVICE

[72] Inventor: Sydney Bennett, Batley, England

[73] Assignee: Joshua Shaw & Sons Limited, Batley, England

[22] Filed: Dec. 22, 1969

[21] Appl. No.: 887,142

[30] Foreign Application Priority Data

Jan. 3, 1969    Great Britain..........................509/69

[52] U.S. Cl............................................60/52 VS, 60/53 R
[51] Int. Cl...................................................F15b 7/00
[58] Field of Search......................................60/52 VS, 53 R

[56] References Cited

UNITED STATES PATENTS

| | | | |
|---|---|---|---|
| 1,628,603 | 5/1927 | Ferris | 60/52 VS UX |
| 1,760,915 | 6/1930 | Robson | 60/52 VS UX |
| 2,896,411 | 7/1959 | Bowers et al. | 60/52 VS |
| 3,164,960 | 1/1965 | Weisenbach et al. | 60/52 VS |
| 3,475,903 | 11/1969 | Christenson | 60/52 VS X |

Primary Examiner—Edgar W. Geoghegan
Attorney—Abraham A. Saffitz

[57] ABSTRACT

In a hydrostatic transmission having a variable volume swash plate pump, a control device which automatically overrides the ratio setting controls of the transmission and reduces the swash plate angle in the event that there is a sudden increase in load on the transmission to prevent damage to the prime mover driving the pump. This is achieved by mounting a cylinder for rocking movement on the pump and connecting the piston thereof to the swash plate angle adjusting mechanism so that alteration of the cylinder's angular position by the transmission controls adjusts the pump swash plate angle and pump output. The automatic override is achieved by hydraulically coupling the pump output to the cylinder so that the piston of such cylinder is displaced along its axis should the output pressure of the pump increase above a predetermined limit, and the displacement of the piston reduces the swash plate angle until the increase in load is removed.

4 Claims, 3 Drawing Figures

INVENTOR
SYDNEY BENNETT
BY Abraham A. Saffitz
ATTORNEY

INVENTOR
SYDNEY BENNETT
BY Abraham A. Saffitz
ATTORNEY

CONTROL DEVICE FOR A HYDROSTATIC TRANSMISSION AND A HYDROSTATIC TRANSMISSION EMBODYING SUCH A DEVICE

This invention relates to a control device for a hydrostatic transmission comprising a hydraulic pump and at least one hydraulic motor, and a pump, transmission and fork lift truck including such a device.

In a hydrostatic transmission involving a pump which supplies a hydraulic motor, there is usually some means whereby the transmission ratio can be varied where the pump is of the variable volume swash plate type, ratio variation being usually obtained by varying the swash plate angle of the pump. As with any other transmission, it is undesirable to overload it, or the prime mover driving same, and this invention is concerned with a device for preventing, in use, excessive overloading of a hydrostatic transmission or the prime mover driving same.

Hydrostatic transmissions are most commonly used in the field of small, slow moving vehicles such as in dumper trucks, fork lift trucks, tractors and the like, and indeed our interest in this field is in fork lift trucks. However, it is appreciated that a hydrostatic transmission can be used in any application where a transmission is required, and although in many such instances a hydrostatic transmission is not the most suitable transmission to use, nevertheless development is taking place on hydrostatic transmissions, and such a transmission may prove to be the most suitable in these cases in the future. Because of the above, we do not wish this invention to be considered as applicable only to be used on hydrostatic transmissions for fork lift trucks, although we will refer mainly to fork lift or other truck applications.

According to the present invention there is provided a control device for a hydrostatic transmission including a pump and hydraulic motor, said device comprising a connection means adapted to be connected to the ratio adjusting mechanism of the transmission, and ratio adjusting means operable to move the connection means for the purposes of adjusting the transmission ratio, said connection means being adapted to be capable of movement and over-riding the ratio adjusting means in response to the loading condition on the transmission, to prevent overloading of such transmission.

The connection means preferably includes a hydraulic control cylinder which is adapted to be in hydraulic communication with the transmission so as to expand or retract in response to the loading on the transmission.

The hydraulic control cylinder is preferably single acting with a compression spring acting in the crown side of the piston and the rod side adapted to be in hydraulic communication with the transmission.

The hydraulic cylinder is preferably adapted and connected for pivotal movement by the ratio adjusting means.

The ratio adjusting means preferably includes two ratio adjustment cylinders for pivoting said hydraulic control cylinder to one side of a neutral position for forward drive of the transmission and to the other side of the neutral position for reverse drive of the transmission.

The ratio adjustment cylinders may be operable by forward and reverse foot pedals.

The device may further include biassing means biassing the hydraulic control cylinder to the neutral position, which biassing means serves to return the hydraulic cylinder to the neutral position in the absence of any operation of the ratio adjusting means.

The invention also includes a hydrostatic transmission and a device as aforesaid operatively connected thereto. The connecting means is preferably connected to the pump volume control mechanism, and the pump output is hydraulically connected to the connecting means to enable such means to operate in response to the transmission loading.

An embodiment of the present invention will now be described, by way of example, with reference to the accompanying drawings wherein.

Figure 1:
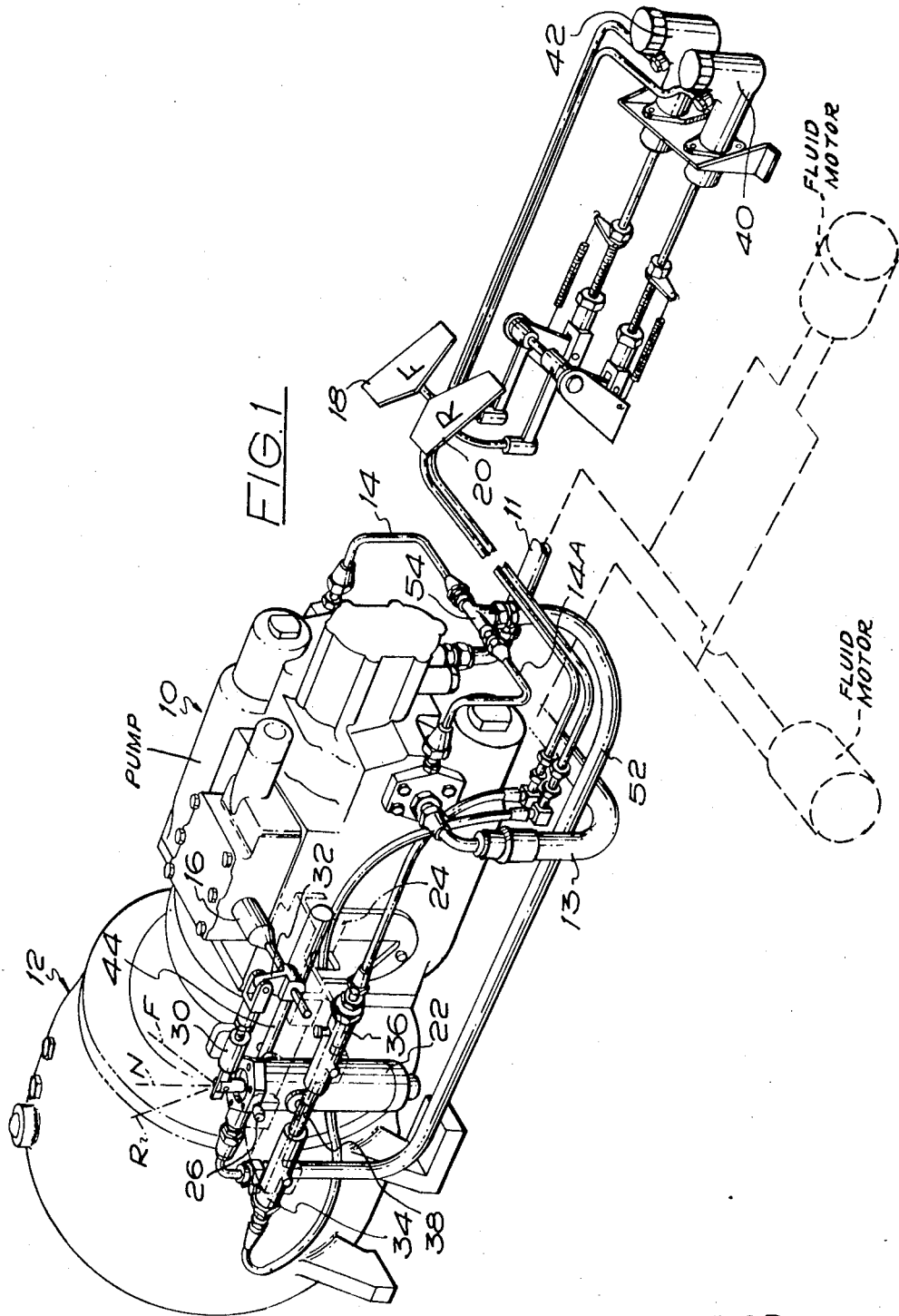
FIG. 1 is a perspective view of part of a hydrostatic transmission which has been fitted with a device according to the invention.

Referring to FIG. 1, in this Figure there is shown a variable volume pump of a hydrostatic transmission, which pump is indicated at 10, and a prime mover, in this case an electric motor 12, drivingly coupled to the pump 10.

The unit comprising the prime mover 12 and transmission is for driving ground engaging wheels of a fork lift truck and in this example the pump supplies two hydraulic motors in parallel which are mechanically connected in known manner to the drive wheels of the truck.

The electric motor 12 may be of the type adapted to be supplied with electrical power from storage batteries carried on the truck.

The transmission is of the type wherein the variable volume pump can be set to drive the hydraulic motors, either in the forward direction or in the reverse direction. In one case the pump 10 supplies the pressure fluid to the motors to drive same through conduit 11, the return flow being via conduit 13, and in the other case the flow of fluid is reversed.

The pump 10 of the transmission includes a variable angle swash plate, whereby the output of the pump, and hence the ratio of the transmission may be varied. The swash plate is adjustable by rotation of a ratio adjustment shaft 16 which has a neutral position in which the pump does not deliver any output. Rotation of this shaft 16, as seen in FIG. 1, in the anticlockwise direction arranges for the hydraulic fluid under pressure to be supplied to the motors to drive same in the reverse direction, whereas clockwise rotation from a neutral position varies the swash plate angle and arranges for the hydraulic fluid under pressure to be supplied to cause the motors to rotate in the forward direction.

The greater the pump swash plate angle, the larger the displacement output of the pump and this is set by manual operation in a fork lift truck, but it is desirable that the swash plate angle for pump output should be reduced automatically in the case where a sudden increase in load is experienced in the transmission. This arrangement also enables a comparatively small rating prime mover 12 to be used and operated within its rated capacity yet cope with considerable increases in hydraulic loading.

The device as shown in FIG. 1 of the drawings, which is attached to the transmission and in particular is coupled to shaft 16 has as its purpose to over-ride the manual setting of the pump swash plate so that the pump output reduces automatically in the event of excessive load increases and regardless of whether the motor is driving in forward or reverse direction, to ensure that the excessive loading is not experienced for any length of time on the transmission and prime mover.

The device according to the invention includes basically, transmission ratio adjusting means in the form of two foot pedals 18 and 20 respectively for adjusting the ratio of the transmission in forward and reverse directions and a means of connection between the ratio adjusting means and the shaft 16 which is capable of adjusting automatically in response to hydraulic loading regardless of the setting for the time being of the appropriate foot pedal 18 or 20.

Figure 2:
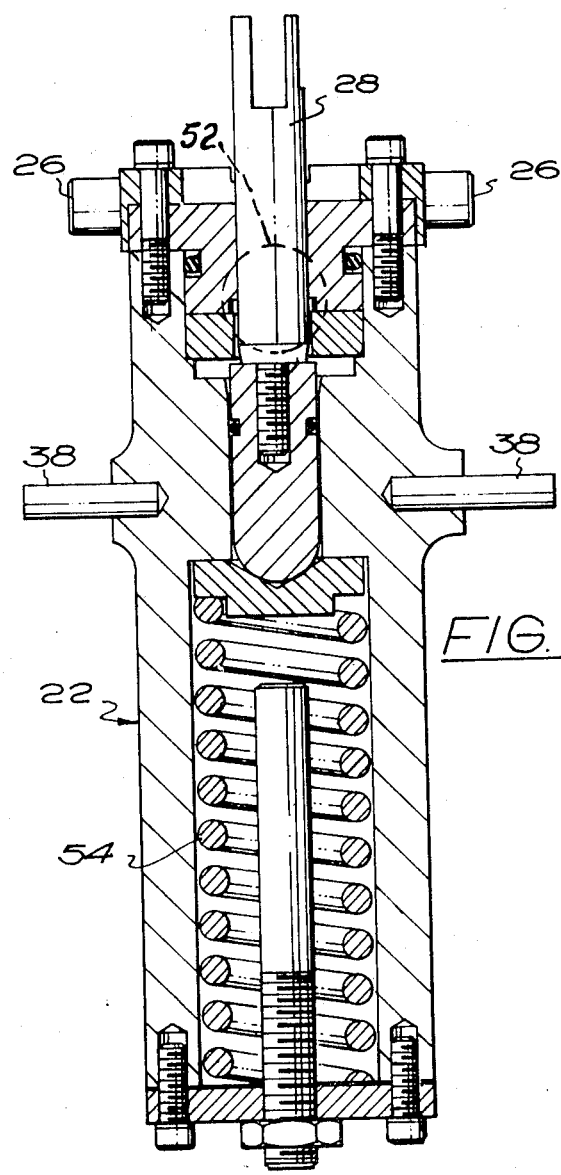
FIG. 2 is a sectional view of the hydraulic control cylinder of the device of FIG. 1.

The means of connection comprises a hydraulic control cylinder 22 of which FIG. 2 is a sectional view, and it is mounted on a plate 24 shown in chain dotted lines in FIG. 1, so that it is disposed upright and is capable of pivotal or rocking movement on trunnions 26 at the top end thereof. Thus the cylinder 22 can be swung to one side or the other of the upright disposition by the ratio adjusting means to vary the transmission ratio during forward and reverse driving respectively. The chain dotted lines marked R, N and F show relative angular positions of the cylinder 22 in reverse, neutral and forward drive dispositions. The piston 28 of the cylinder 22 projects from the top end of the cylinder and is connected to a horizontal control link 30 which is adjustable in length and which has its other end connected to a pivoted arm 32 rigidly secured to shaft 16.

Figure 3:
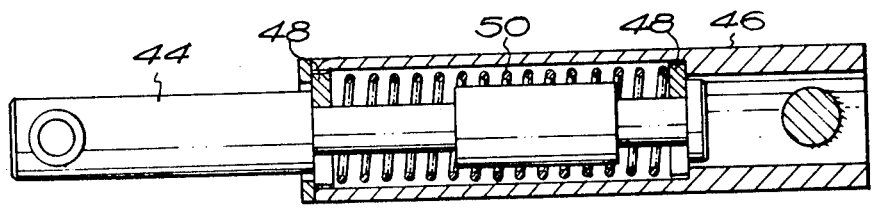
FIG. 3 is a sectional view of the biassing plunger of the device of FIG. 1.

Suspended on the underside of plate 24 on suitable lugs are displacement cylinders 34 and 36 which are connected through their pistons to one of a pair of pins 38 disposed under the trunnions 26 on cylinder 22. The cylinders 34 and 36 are pressurised respectively by depression of pedals 20 and 18 through master cylinders 40 and 42. Each cylinder 34 and 36 is single acting and contains a return spring tending to return the piston thereof to a neutral position. The device includes a biassing unit in the form of a plunger 44 which is slidably located in a cylindrical casing 46. The free end of the plunger 44 is pivotally connected to the other pin 38 and the cylindrical casing 46 is mounted on the underside of plate 24. As shown clearly in FIG. 3, washers 48 sitting on shoulders of the plunger 44 and internal abutments in casing 46 contain therebetween compression spring 50 which acts such that if the plunger 44 is pushed either to the left or to the right in FIG. 3, the spring 50 urges same back to the shown position. This position corresponds to the neutral position of the cylinder 22 and thus, when the cylinder 22 is swung to one side or the other by depression of pedal 18 or 20, and the pedal is then released, the cylinder 22 under the action of the biassing unit will return quicker to the position shown in FIG. 1 than it would if the device released the foot pedal slowly.

This provides the advantage that if the driver wishes to obtain a quick acting braking effect from the transmission, he releases the depressed pedal quickly and by the return of the cylinder 22 to the neutral position under the biassing of the spring 50 the braking effect is obtained quickly.

To provide the over-ride arrangement, a hydraulic communication pipe 52 extends from a T-junction 54, to which conduits 14 and 14A lead, to the rod side of the piston contained in cylinder 22.

Conduits 14 and 14A respectively are in hydraulic communication with pump pipes 11 and 13 so that either pipe 14 or 14A experiences the pump output pressure when there is any output therefrom. The T-junction 54 contains a shuttle valve which moves to one side or the other, depending upon which pipe 14, 14A contains fluid under pressure, to close off the other pipe 14, 14A while allowing the pressure to be applied to the fluid in pipe 52.

The piston 28 of cylinder 22 is urged upwardly by means of a compression spring 54 so that in the absence of any force urging the piston 28 downwards such piston takes up the position shown in FIG. 2. When a pressure exceeding a predetermined pressure e.g. 500 lb/in² is experienced, however, in either of conduits 14 or 14A then the pressure in this conduit is experienced on the rod side of piston 28 and the rod is moved downwards in FIGS. 1 and 2 at a predetermined rate.

The operation of the transmission with the device is as follows.

Assuming that there is no pressure on either foot pedal 18 or 20 and the truck embodying the transmission is stationary. This will be so, because the cylinder 22 will be held in the vertical neutral position as will the swash plate of the pump of the transmission. When either foot pedal, say the forward motion foot pedal 18 is depressed, then cylinder 36 will be pressurized causing cylinder 22 to swing clockwise in FIG. 1 with the result that shaft 16 is rotated in a clockwise direction and the swash plate angle of the pump is adjusted. The pump now starts to deliver hydraulic fluid to the motors which in turn rotate and cause the truck to be propelled forward.

The driver increases the speed of the truck up to a maximum by further depression of the pedal 18. If at any position of pedal 18, the truck should suddenly meet an excessive load, such as may be caused by the encounter of a steep incline, causing the pressure in conduit 52 to exceed said predetermined value, this causes the piston of cylinder 22 to be deflected downwards, thus causing the shaft 16 to be rotated an appropriate amount back towards the neutral position and the pump output is thus reduced to prevent overloading of the motor 12.

When the load is removed, then of course, the pressure signal in cylinder 22 is removed, the piston thereof rises and the pump swash plate returns to the angle corresponding to the amount of depression of foot pedal 18 at the time.

Thus, the device provides an automatic safety override for the transmission, which device comes into effect when there is an excessive load demand; the override device comes into operation regardless of the setting of the foot pedal 18 or, when the motor is driving in reverse, foot pedal 20.

Operation of the device when the vehicle is being driven in reverse is identical to the operation described in relation to the forward drive, except that when cylinder 34 is operative and cylinder 22 is pivoted anti-clockwise, as in FIG. 1, under excessive load conditions, the swash plate is again pulled back towards the neutral position, regardless of foot pedal setting.

The above described arrangement of the device is only one form and modifications are possible.

Thus for example, the cylinders 34 and 36 could be arranged to act on a member which in turn moves the cylinder 22, rather than having the direct connection illustrated, and instead of cylinder 22 being pivoted by cylinders 34 and 36 it could in a modification be moved in a reciprocatory manner. The connection of the device to the transmission is shown as being to a pump swash plate control shaft, but of course, if the transmission is controlled in another manner it would simply be a matter of coupling the control link 30 in a suitable manner to any such other control mechanism.

Although in the described embodiment, the automatic override device works in both forward and reverse driving of the vehicle, the conduit 52 may be connected, with the shuttle valve 54 and one of pipes 14, 14A omitted, to operate the device only in forward driving of the vehicle because in practice the vehicle will probably only be driven in reverse in cases where an excessive increase in load is unlikely to be experienced.

In the example, the pump 10 supplies two motors, but clearly the pump could be arranged to supply one or more than two of such motors, depending upon the use to which the transmission is to be put.

I claim:

1. In a hydrostatic transmission having a swash plate pump with inlet and outlet ports, a swash plate adjusting mechanism therefor and a hydraulic motor, a control device comprising a hydraulic piston and cylinder assembly which is mounted for tilting movement about a horizontal axis to one side or the other side of a neutral non-tilted position, a horizontally disposed connection link connecting said piston and cylinder assembly with said swash plate adjustment mechanism, a rocking means connected to said piston and cylinder assembly to tilt the same and thereby adjust the pump swash plate angle, and a hydraulic connection means for hydraulically connecting the pump ports with the piston and cylinder whereby the pump output pressure is effected in the piston and cylinder assembly and an increase in output pressure causes a change in the effective length of said piston and cylinder assembly, and by displacement of said connecting link causes movement of the pump swash plate towards said neutral position, overriding the said tilting means.

2. A transmission and control device according to claim 1, wherein the hydraulic control piston and cylinder assembly is a single acting assembly provided with a compression spring acting on one side of the piston and with the other side of the piston being in hydraulic communication with the pump output port.

3. A transmission and control device according to claim 1, wherein the hydraulic piston and cylinder assembly is pivotally mounted in trunnions on a port plate, said port plate being mounted in relation to the pump so that the piston and cylinder assembly assumes an upright disposition.

4. A transmission and control device according to claim 1, wherein the piston rod of the hydraulic piston and cylinder assembly projects out of the top end of the cylinder and is connected to said horizontally disposed connection link at one end thereof while the other end is connected to the pump swash plate angle adjusting mechanism.